United States Patent [19]

Herren et al.

[11] Patent Number: 5,030,551
[45] Date of Patent: Jul. 9, 1991

[54] LASER MARKING OF CERAMIC MATERIALS, GLAZES, GLASS CERAMICS AND GLASSES

[75] Inventors: Fritz Herren, Düdingen; Manfred Hofmann, Marly, both of Switzerland

[73] Assignee: Ciba-Geigy Corporation, Ardsley, N.Y.

[21] Appl. No.: 503,332

[22] Filed: Apr. 2, 1990

[30] Foreign Application Priority Data

Apr. 6, 1989 [CH] Switzerland .......................... 1276/89

[51] Int. Cl.$^5$ .......................... G03C 5/16; G03C 5/00
[52] U.S. Cl. .................... 430/495; 430/947; 430/945; 430/346; 430/270; 346/76 L
[58] Field of Search ............... 430/270, 346, 495, 945, 430/947, 286; 346/76 L, 135.1

[56] References Cited

U.S. PATENT DOCUMENTS

| | | |
|---|---|---|
| 2,824,114 | 2/1958 | Bostwick . |
| 3,051,593 | 8/1962 | Gray, Jr. et al. . |
| 4,654,290 | 3/1987 | Spanjer .............................. 430/945 |
| 4,769,310 | 9/1988 | Gugger et al. ...................... 430/346 |
| 4,797,871 | 1/1989 | Iyan et al. ........................... 369/100 |

FOREIGN PATENT DOCUMENTS 3539047 7/1986 Fed. Rep. of Germany .

OTHER PUBLICATIONS

Chem. Abst., 103, 26188n (1985).
Ullmann's Enzyk. Chem. 4th Ed., vol. 12, pp. 317-366.
Ullmann's Enzyk. Chem. 4th Ed., vol. 13, pp. 712-716.
Ullmann's Enzyk. Chem. 4th Ed., vol. 13, pp. 722-724.
Ullmann's Enzyk. Chem. 4th Ed., vol. 14, p. 11.
Organic Titanium Compounds Brochure p. 13.
Gretag Laser Systems Brochure.

Primary Examiner—Hoa Van Le
Assistant Examiner—Ashley I. Pezzner
Attorney, Agent, or Firm—Luther A. R. Hall

[57] ABSTRACT

A method of laser marking ceramic materials, glazes, glass ceramics and glasses of any desired form, which comprises applying to the material to be marked a 100 to 10,000 Å thick transparent layer of titanium dioxide, then irradiating said oxide layer with a pulsed laser such that the radiation is directed onto said layer in accordance with the form of the marking to be applied, and using laser light of a wavelength which is sufficiently absorbed by the oxide layer, so that a discolouration of said oxide layer is produced at the irradiated areas.

13 Claims, No Drawings

LASER MARKING OF CERAMIC MATERIALS, GLAZES, GLASS CERAMICS AND GLASSES

The present invention relates to a process for laser marking ceramic materials, glazes, glass ceramics and glasses, and to the marked material so obtained.

The marking of ceramic materials, glazes and glasses can be effected by conventional marking and decoration methods such as etching, cutting, engraving, grinding or by applying a glass or glaze colourant. In these methods, the surface of the marked material is altered, with the consequence that the material may suffer damage, especially if marking is effected by etching, engraving or cutting. The application of a glass or glaze colourant necessitates in addition a second firing step. The markings so produced are not always satisfactory in all respects.

It is also known to mark glass by means of a laser beam, whereas the known methods are based on melting or removing matrix material such that the surface of the marked material is also altered. Thus, for example, the proposal is made in DD patent specification No. 215776 to produce coloured images on glass by irradiation with a laser beam. This method comprises irradiating the glass, which is provided with a coating containing colourant, such that the colourant diffuses into the glass softened by the laser beam.

It is further known from U.S. Pat. No. 4,769,310 to mark ceramic materials, glazes, glass ceramics and glasses which contain a radiation-sensitive additive without damaging the surface of the material which it is desired to mark. In this method, the energy source is a laser beam whose wavelength is in the close UV and/or visible range and/or IR range, and an inorganic pigment is used as radiation-sensitive additive.

Finally, German Offenlegungsschrift 3 539 047 postulates a method of decorating, marking and engraving enamelled objects using laser beams by incorporating into the enamel coating opacifying agents which the laser beam causes to decompose optically and locally, for example oxides of titanium, tin, cerium and antimony. A drawback of this method is that, for example, transparent enamelled objects cannot be marked because the opacifying agent incorporated in the enamel coating does not change optically at the non-irradiated areas and therefore strongly influences the overall appearance of the object. Furthermore, the opacifying agent employed may adversely affect the mechanical properties of the enamel.

There has now been found a flexible method which makes it possible to mark ceramic materials, especially of already baked ceramic materials, glazes, glass ceramics and glasses, without damaging the surface thereof and without specific requirements being made of the substrate, which method comprises the use of a transparent metal oxide layer for the laser marking.

Accordingly, the present invention relates to a method of laser marking ceramic materials, glazes, glass ceramics and glasses of any desired form, which comprises applying to the material to be marked a 100 to 10,000 Å thick transparent layer of titanium dioxide, then irradiating said oxide layer with a pulsed laser such that the radiation is directed onto said layer in accordance with the form of the marking to be applied, and using laser light of a wavelength which is sufficiently absorbed by the transparent oxide layer, so that a discolouration of said oxide layer is produced at the irradiated areas.

The method of this invention is especially suitable for marking glasses and glass ceramics. Glasses and glass ceramics are well-known to the person skilled in the art and described, for example, in Ullmanns Enzyklopädie der technischen Chemie, 4th edition, Vol. 12, pp. 317–366.

By ceramic materials are meant inorganic, non-metallic, high-melting materials that are usually referred to in the literature as clay ceramics and special ceramics. Examples thereof are oxides in crystalline or glassy form, e.g. alkali metal or alkaline earth metal aluminosilicates or aluminoborates, as well as non-oxides such as carbides, nitrides and silicides. For further examples, attention is drawn to Ullmanns Enzyklopädie der techn. Chemie, 4th Edition, Vol. 13, pp. 712–716.

Glazes are glassy coatings applied to a ceramic material and having a composition very similar to that of glass (op. cit., pp. 722–724). Typical examples of glazes are those consisting of quartz, clay, alkali metal oxides, alkaline earth metal oxides, and low melting oxides (such as $Na_2O$, $K_2O$, $CaO$ and $BaO$) as fluxes.

Depending on the utility, the materials to be marked may be colourless, white or coloured with a suitable pigment (on which the grey-black coating additionally provides the sufficient contrast), or with a layer which contains such a pigment (e.g. glass colourant or coloured glaze).

The titanium dioxide layer is conveniently amorphous and has a thickness of preferably 200 to 5000 Å, but most preferably of 1000 to 3000 Å.

The application of the oxide layer to the material to be marked can be made by methods which are known per se, for example by vapour deposition under vacuum. One of the commonest methods of applying the oxide layer of this invention is to treat the ceramic material with an organic titanium compound, for example at elevated temperature, so that the organic titanium compound decomposes by pyrolysis to form an oxide layer on the ceramic material to be marked. The temperature during the pyrolysis must be so chosen that the ceramic material (substrate) does not, or does not materially, change, whereas the organic titanium compound decomposes. In this method, the organic titanium compound can, for example, be brought into contact in vapour form with the hot substrate or sprayed on to the hot substrate. The substrate can also be coated cold with the organic titanium compound, or with a solution thereof, and subsequently refired.

Suitable organic titanium compounds are typically the titanium acetylacetonates such as diisopropoxybis(2,4-pentanedionato) titanium(IV) or tetraalkoxy titanates or mixtures of different tetraalkoxy titanates disclosed, for example, in U.S. Pat. No. 2 824 114 or 3 051 593. Preferred tetraalkoxy titanates are those containing 2 to 4 carbon atoms in each of the alkyl moieties, most preferably titanium isopropylate or the titanates disclosed in U.S. Pat. No. 3 051 593.

Additional information on such methods (also called "titanization of glass") will be found in U.S. Pat. No. 3 051 593 and in the technical bulletin of TIL (Titanium Intermediates Limited), on page 13.

A further method of preparing thin oxide layers follows the method of preparing ceramic lustres (q.v. Ullmanns Enzyklopädie der techn. Chemie, 4th edition, Vol. 14, page 11). In this method, an organic titanium compound (e.g. titanium isopropylate or, preferably, diisopropoxy-bis(2,4-pentanedionato)tititanium (IV), is dissolved in an organic pasting agent which is used for glass colourants which are applied by screen printing, and which consists essentially of resins and resin oils. The liquid is then (if necessary after being suitably diluted) spread on a glass plate with a film applicator and subsequently baked, whereupon the organic pasting agent is completely evaporated and the titanium compound is pyrolised to the oxide.

It may be advantageous to coat only a portion of the ceramic material with the oxide layer, preferably only the area required for marking.

For marking the inorganic materials suitable for use in the practice of this invention it is preferred to use lasers whose wavelengths are in the UV range, preferably from 190 to 360 nm. The laser beam is directed in accordance with the form of the graphic symbols to be applied almost vertically to the surface, or focused thereon, to produce a discolouration at the irradiated areas.

It is expedient to use lasers which are able to produce pulsed light or pulsed irradiation.

Examples of such laser sources are solid state pulsed lasers such as frequency multiplied ruby lasers or Nd:YAG lasers, pulsed lasers with booster such as pulsed dye lasers or Raman shifter, and also continuous wave lasers with pulse modifications (Q-switch, mode locker), for example on the basis of CW Nd:YAG lasers with frequency multiplier or CW ion lasers (Ar, Kr), as well as pulsed metal vapour lasers (frequency multiplied), for example copper vapour lasers or gold vapour lasers, or pulsed gas lasers such as excimer and nitrogen lasers.

Depending on the laser system employed, pulse contents of up to several joules, intensities of up to $10^{12}$ W/cm$^2$, pulse durations of $10^{-6}$ to $10^{-15}$ seconds and frequencies of up to $10^9$ Hz are possible. Pulse contents of micro-joule to joule, intensities of kilowatt/cm$^2$ to 100 megawatt/cm$^2$, pulse durations of microseconds to picoseconds, and frequencies of hertz to 250 megahertz are advantageously used.

It is preferred to use lasers with pulsed light, for example those listed in the following table. Especially preferred lasers are pulsed or pulse-modified, frequency multiplied Nd:YAG lasers or metal vapour lasers such as Au- or, in particular, Cu-vapour lasers, or excimer lasers.

TABLE

| Type/Representative | Examples of commercially available types | Principal wavelength (subsidiary wavelengths) [nm] |
|---|---|---|
| Solid state pulsed lasers | | |
| Ruby lasers | Lasermetrics (938R6R4L-4) | 694 (347) |
| Nd:YAG laser | Quanta Ray (DCR 2A) | 1064, (532, 355, 266) |
| Pulsed lasers with booster such as | | |
| Raman shifter | Quanta Ray (RS-1) | UV-IR |
| dye laser | Lambda Physik FL 2002 | ca. 300–1000 |
| CW laser with pulse modification (frequency multiplied) | | |
| ND:YAG (Q-Switch, 2ω) | Lasermetrics (9560QTG) | 532 (355, 266) |
| Argon (mode-locked/ frequency doubled) | Spectra-Physics, Mod. 2040 or 2030 | 514.5; 488 (257) (477, 497) |
| Pulsed metal vapour lasers frequency doubled) | | |
| Cu vapour laser | Plasma-Kinetics 751 | 510, 578 (260, 289) |
| Au vapour laser | Plasma-Kinetics | 628 (314) |
| Mn vapour laser | Oxford | 534,1290 (267) |
| Pb vapour laser | Laser CU 25 | 723 (362) |
| Pulsed gas lasers Excimer | | |
| XeCl | | 308 |
| XeF and | Lambda Physik EMG-103 | 351 |
| N$_2$ | | 337 |

In the practice of this invention, the laser employed will be for example a pulsed, frequency multiplied UV-Nd: YAG laser with a pulse content from 0.01 to 1 joule/cm$^2$, a maximum capacity of about 40 megawatts, pulse durations of 6–8 nanoseconds and a frequency of 20 Hz (Quanta Ray DCR-2A, available from Spectra Physics, Mountain View, California). Pulse contents from 0.1 to 0.5 joule/cm$^2$ and a pulse duration of 5 to 40 nanoseconds are preferred.

If a frequency doubled copper vapour laser (Plasma Kinetics 151) is used, exposure will be carried out with a pulse duration of 30 nanoseconds and a frequency of 6 kHz.

Lasers whose parameters can be readily adjusted, for example pulse content and pulse duration, permit the best possible adaptation to the requirements of the materials to be marked.

The best wavelength to be selected for radiation is that at which the oxide layer absorbs light most strongly and the substrate to be marked less strongly.

Three different methods are suitable for laser marking in the practice of this invention: the mask method, the linear marking method and the dot matrix method.

In these last two mentioned methods (dynamic focusing), the laser is preferably combined with a laser marking system so that the inorganic material can be marked with any, e.g. computer-programmed, digits, letters and special symbols, decorations, marks and the like at the point where the laser beam strikes.

The choice of laser system in respect of capacity and frequency depends basically on the marking method employed. The high capacity and low frequency of the solid state pulsed lasers and excimer lasers are preferred for mask exposure. The average to low capacities and rapid frequencies of pulsed metal vapour lasers or of continuous wave lasers with pulse modifications are preferred for producing markings that require dynamic focusing. Beam deflection can be effected for example, acousto-optically, holographically, with galvo-mirrors or polygon scanners. Dynamic focusing makes possible an extremely flexible marking, as the marks can be produced electronically.

A very wide range of markings can be produced by the present invention. Examples are: variable text programming of numerical symbols by inputting text with a video display unit, test programs of standard symbols or special symbols such as monograms, initials and inscriptions, logos, or frequently recurring data, continuous piece numbering, input of measurable variables, input of a stored program, linear marking or also decorations for glass and ceramic articles such as glasses, bottles, tiles, vases.

The method of this invention can be used for marking a very wide range of industrial products and articles such as ceramic work pieces and supports, glasses, glass ceramics and glazes. In particular, it is also possible to mark delicate, fragile objects with care and without contact.

Typical examples of utilities are the marking of ceramic supports and casings of solid-state circuits, ceramic printed circuit boards (thick-layer, thin-layer and multi-layer PCBs), electronic components such as insulators, mechanically stressed high-temperature components such as ceramic parts used in engine construction, and also work pieces for metal cutting, as well as electric light bulbs. The method of this invention is especially advantageous for frequently changing marking substrates, e.g. for marking customer-specific electronic components, for small run productions or for applying continuous serial numbers.

The method of the present invention makes it possible to produce a direct and rapid marking that is indelible and which is therefore abrasion- and scratch-proof. The markings obtained are also corrosion-proof, solvent-resistant, dimensionally stable, free from deformation, fast to light, heat and weathering, easily legible, and have good contrast and very good edge definition. In addition, there is virtually no impairment of the mechanical, physical and chemical properties of the marked material, e.g. mechanical strength and chemical resistance.

The method of this invention makes it possible to produce not only visual marks, but also marks or digitally coded information in the micro range. In this last mentioned case, the markings can be read out with known commercially available microreaders, for example with a laser, which are known to the skilled person.

In the method of this invention, a colour change to grey or black of pronounced contrast occurs at the irradiated area of the material upon exposure to a laser beam.

The surprising feature of this invention is that the titanium dioxide employed, which withstands very high firing temperatures of up to 1200° C. and is known to have good light-resistance, none the less undergoes a colour change (dark discolouration of the transparent oxide coating) when exposed to intense irradiation.

In the following Examples parts are by weight, unless otherwise stated.

EXAMPLES 1-4:

a) Preparation of the samples

Glass plates (window glass) measuring $7.5 \times 5 \times 0.1$ cm (length×height×width) are heated to ca. 500° C., sprayed hot with a 10% solution of titanium isopropylate, and then heated again to ca. 500° C.

b) Measuring the thickness of the $TiO_2$ layer

The thickness of the $TiO_2$ layer is measured by X-ray fluorescence. This is done by determining the surface concentration in $\mu g/cm^2$, and subtracting the Ti content present in the uncoated glass (ca. 3 $\mu g/cm^2$). For determining the layer thickness, a $TiO_2$ density of 4 $g/cm^3$ is assumed.

c) Marking

Mask marking with an excimer laser (XeCl) having a wavelength of 308 nm and a pulse content of 130 mJ, and producing an image of the mask (letter "K", 10 mm high and 7 mm long) with a quartz lens (focal length 100 mm) at a distance of 120 mm, corresponding to a reproduction ratio of 3 to 1. One laser pulse per digit. The results are reported in the following table.

| Example | $\mu g/cm^2$ Ti | Thickness of $TiO_2$ layer (in Å) | Irradiation at 308 nm with | Result (appearance of the marking) |
|---|---|---|---|---|
| 1 | 3.0 | 120 | 450 mJ/cm$^2$ | pale grey |
| 2 | 16.7 | 650 | 450 mJ/cm$^2$ | pale grey |
| 3 | 65.7 | 2570 | 450 mJ/cm$^2$ | black-grey |
| 4 (reference: uncoated glass plate) | — | — | 450 mJ/cm$^2$ | no marking |

EXAMPLES 5-8:

a) Preparation of the samples

A specific amount X of a 75% solution of diisopropoxy-bis(2,4-pentanedionato)titanium ((IV) in isopropanol [$TiO_2$ content: 16.5%; density 1 $g/cm^3$] is mixed with 1 ml of a mixture of 2 g of isopropanol and 8 g of a pasting agent for glass colourants (screen printing oil No. 175, consisting essentially of 80% pine oil and 18% ®Abalyn (rosin); DRAKENFELD COLORS, Washington PA). This mixture is spread on a glass plate using a film applicator (layer thickness 100 $\mu m$), and the film so obtained is exposed to the air for 10 minutes and dried for 10 minutes at 130° C. in a recirculating air dryer. The plates are subsequently fired in an oven which has been preheated to 620° C. for 1 minute at this temperature, and then slowly cooled in the closed oven. Very homogeneous layers are obtained.

The layer thickness can be readily computed from the amounts of the above titanium compound and from the thickness of the layer applied to the plate. The densities of the liquids can be assumed to be approximately 1 g/cm$^3$ and the density of the titanium dioxide to be 4 g/cm$^3$.

| Example | Amount X of the titanium compound (in mg) | Thickness of the TiO$_2$ layer (in Å) |
| --- | --- | --- |
| 5 | 6 | 250 |
| 6 | 12.5 | 530 |
| 7 | 25 | 1040 |
| 8 | 75 | 2970 | b) Marking

With an excimer laser

The pulse (ca. 20 nanoseconds) EMG 102 excimer laser (supplied by Lambda Physik GmbH, Gööttingen, FRG) is driven at a wavelength of 308 nm with a pulse content of 150 mJ. The laser beam is focused through a metal mask with different letters ("K"; "E"; height 10 mm) and a quartz lens (focal length 200 mm) on to the coated side of the glass plates (reproduction ratio 2.5 to 1). One laser pulse per digit/letter. Grey letters reduced in size and of excellent abrasion resistance are formed.

With a Nd: YAG laser

The output of the pulsed (ca. 7 to 10 nanoseconds) Nd: YAG laser (Quanta Ray DCR-2, supplied by Spectra Physics, Mountain View, USA) is converted by the harmonic generator and the harmonic separator to 355 nm and focused through a quartz lens (focal length 200 mm) on to the coated side of the glass plates (distance from the lens=185 mm). By adjusting the power of the flash lamps to 50 joules (only the oscillator part is switched on), dark grey dots result which can be formed to any desired markings by moving the plate or deflecting the laser beam as is usual in vector marking. A change in colour to grey or black occurs at the marked areas, increasing in intensity with the layer thickness.

What is claimed is:

1. A method of laser marking ceramic materials, glazes, glass ceramics and glasses of any desired form, which comprises applying to the material to be marked a 100 to 10,000 Å thick transparent layer of amorphous titanium dioxide, then irradiating said oxide layer with a pulsed laser such that the radiation is directed onto said layer in accordance with the form of the marking to be applied, and using laser light of a wavelength which is sufficiently absorbed by the oxide layer, so that a discolouration of said oxide layer is produced at the irradiated areas.

2. A method according to claim 1 of marking glass and glass ceramics.

3. A method according to claim 1, wherein the oxide layer has a thickness of 200 to 5000 Å.

4. A method according to claim 1, wherein the oxide layer is applied by treating the ceramic material with an organic titanium compound.

5. A method according to claim 4, wherein the organic titanium compound is a tetraalkoxy titanate or a titanium acetylacetonate.

6. A process according to claim 5, which comprises the use of a tetraalkoxy titanate containing 2 to 4 carbon atoms in each of the alkyl moieties.

7. A process according to claim 6, which comprises the use of titanium isopropylate.

8. A process according to claim 5, which comprises the use of diisopropoxy-bis(2,4-pentadionato)titanium-(IV).

9. A process according to claim 1, which comprises the use of a laser whose wavelength is in the UV range.

10. A process according to claim 9, wherein the wavelength is in the range from 190 to 360 nm.

11. A process according to claim 1, which comprises the use of a pulsed or pulse-modified, frequency multiplied Nd:YAG laser or metal vapour laser, or an excimer laser.

12. A process according to claim 1, wherein irradiation is effected at a pulse content from 0.1 to 0.5 joule per cm$^2$ and a pulse duration of 5 to 40 nanoseconds.

13. A ceramic material, glaze, glass ceramic or glass laser marked by the process according to claim 1.

* * * * *